US011024005B2

(12) United States Patent
Gao et al.

(10) Patent No.: US 11,024,005 B2
(45) Date of Patent: Jun. 1, 2021

(54) OPTICAL FLOW TRACKING DEVICE AND METHOD (71) Applicant: SZ DJI TECHNOLOGY CO., LTD., Shenzhen (CN)

(72) Inventors: Mingming Gao, Shenzhen (CN); Kang Yang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/709,042

(22) Filed: Dec. 10, 2019

(65) Prior Publication Data
US 2020/0118245 A1 Apr. 16, 2020

Related U.S. Application Data (63) Continuation of application No. PCT/CN2017/091102, filed on Jun. 30, 2017.

(51) Int. Cl.
G06K 9/32 (2006.01)
G06T 3/40 (2006.01)
G06T 7/00 (2017.01)

(52) U.S. Cl.
CPC .......... G06T 3/4007 (2013.01); G06T 7/0002 (2013.01); G06T 2207/20016 (2013.01)

(58) Field of Classification Search
CPC ............... G06T 3/4007; G06T 7/0002; G06T 2207/20016; G06T 2207/10016; G06T 7/269
See application file for complete search history.

(56) References Cited

U.S. PATENT DOCUMENTS

| 5,187,777 A | 2/1993 | Conboy et al. |
| 2013/0076915 A1* | 3/2013 | Ramachandran ....... G06T 7/207 348/207.1 |

(Continued)

FOREIGN PATENT DOCUMENTS

| CN | 104978728 A | 10/2015 |
| CN | 105787901 A | 7/2016 |

(Continued)

OTHER PUBLICATIONS

The World Intellectual Property Organization (WIPO) International Search Report for PCT/CN2017/091102 dated Mar. 28, 2018 8 pages.

Primary Examiner — Dhaval V Patel
(74) Attorney, Agent, or Firm — Anova Law Group, PLLC (57) ABSTRACT The present disclosure provides an optical flow tracking device. The device includes an image pyramid establishing circuit configured to establish a first image pyramid of a first image and a second image pyramid of a second image. The first image pyramid includes one or more image layers, and the second image pyramid includes one or more image layers. The device further includes an optical flow tracking circuit configured to perform an optical flow tracking processing on a $k^{th}$ image layer in the first image pyramid and a $k^{th}$ image layer in the second image pyramid to acquire an optical flow estimator of the second image in the $k^{th}$ image layer. K is an integer. The optical flow tracking circuit is configured to calculate an optical flow of the second image by using the optical flow estimator of the second image in the $k^{th}$ image layer.

20 Claims, 7 Drawing Sheets (56) References Cited

U.S. PATENT DOCUMENTS

2018/0137633 A1\* 5/2018 Chang .................. G06K 9/4628
2018/0293737 A1\* 10/2018 Sun ......................... G06T 7/251

FOREIGN PATENT DOCUMENTS

| CN | 105809712 A | 7/2016 |
| CN | 105979174 A | 9/2016 |
| CN | 106803265 A | 6/2017 |

\* cited by examiner

OPTICAL FLOW TRACKING DEVICE AND METHOD

CROSS-REFERENCE TO RELATED APPLICATION

This application is a continuation of International Application No. PCT/CN2017/091102, filed on Jun. 30, 2017, the entire content of which is incorporated herein by reference.

TECHNICAL FIELD

The present disclosure relates to the field of image processing and, more specifically, to an optical flow tracking apparatus and method.

BACKGROUND

Image pyramid is a type of multi-scale representation of images as it is an effective by conceptually simple structure for interpreting images with multiple resolutions. Image pyramids have many uses, for example, it may be used for optical flow tracking.

When the image pyramids are used for optical flow tracking, the calculations involved can be highly complex, which may require a high performance system. On one hand, if the system has more hardware resources, the system performance may be improved, but it may impose certain restrictions on system upgrade and maintenance. On the other hand, if the system has fewer hardware resources, the system may be easier to upgrade and maintain, but the system performance may be poor.

When using the image pyramid for optical flow tracking, how to make full use of the system resources to facilitate subsequent system upgrade and maintenance without affecting the system performance is an area that can be improved.

SUMMARY

One aspect of the present disclosure provides an optical flow tracking device. The device includes an image pyramid establishing circuit configured to establish a first image pyramid of a first image and a second image pyramid of a second image; the first image pyramid includes one or more image layers, and the second image pyramid includes one or more image layers. The device also includes an optical flow tracking circuit configured to perform an optical flow tracking processing on a $k^{th}$ image layer in the first image pyramid and a $k^{th}$ image layer in the second image pyramid to acquire an optical flow estimator of the second image in the $k^{th}$ image layer, k being an integer; and to calculate an optical flow of the second image by using the optical flow estimator of the second image in the $k^{th}$ image layer. A plurality of multipliers are configured to perform multiplication processing of the optical flow tracking processing by multiplying data corresponding to the image layers of the first image pyramid and the second image pyramid, and each of the plurality of multipliers are configured to perform the multiplication processing on a plurality of clocks in series, and different multipliers of the plurality of multipliers are configured to perform the multiplication processing in parallel on the same clock.

Another aspect of the present disclosure provides an optical flow tracking method. The method includes triggering an image pyramid establishing circuit to establish a first image pyramid of a first image and a second image pyramid of a second image; the first image pyramid includes one or more image layers, and the second image pyramid includes one or more image layers; triggering an optical flow tracking circuit to perform an optical flow tracking processing on a kth image layer in the first image pyramid and a kth image layer in the second image pyramid to acquire an optical flow estimator of the second image in the kth image layer, where k is an integer; and calculate an optical flow of the second image by using the optical flow estimator of the second image in the kth image layer. A plurality of multipliers are configured to perform multiplication processing of the optical flow tracking processing by multiplying data corresponding to the image layers of the first image pyramid and the second image pyramid, and each of the plurality of multipliers is configured to perform the multiplication processing on a plurality of clocks in series, and different multipliers of the plurality of multipliers are configured to perform the multiplication processing in parallel on the same clock.

In embodiments of the present disclosure, in the process of optical flow tracking using the image pyramids, for the multiplication processing, the same multiplier in different clocks can multiply in series, or multiple multipliers can work in parallel on the same clock. As such, low system performance by using a multiplier for all multiplications may be avoided, and the use of too many multipliers for the multiplication processing resulting in consuming additional system hardware resources may be avoided, thereby avoiding the limitations on subsequent system upgrades and maintenance. Therefore, the embodiment of the present disclosure realizes the full utilization of the system resources and facilitates the subsequent system upgrade and maintenance without affecting the system performance.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Image pyramid is a type of multi-scale representation of images as it is an effective by conceptually simple structure for interpreting images with multiple resolutions. In some embodiments, the image pyramid can be obtained by smoothing and/or down sampling. Further, the image pyramid may include a plurality of image layers (which may be referred to as the image layers, layers, pyramid layers, etc.) and an upper layer of the image pyramid may have a lower resolution than the low layer.

Image pyramids have many uses, for example, it may be used for feature point tracking and the like. In feature point tracking, an image pyramid of a first image and an image pyramid of a second image may be established, where the position of the feature point at the first image may be known, and feature point tracking may be performed using the position and/or pixel value of at least one pixel in the second image.

The manner in which the image pyramid is established when using the feature point tracking will be described below with reference to FIG. 1. It should be understood that the method of establishing the pyramid shown in FIG. 1 is merely an implementation manner, and the present disclosure is not limited hereto.

Figure 1:
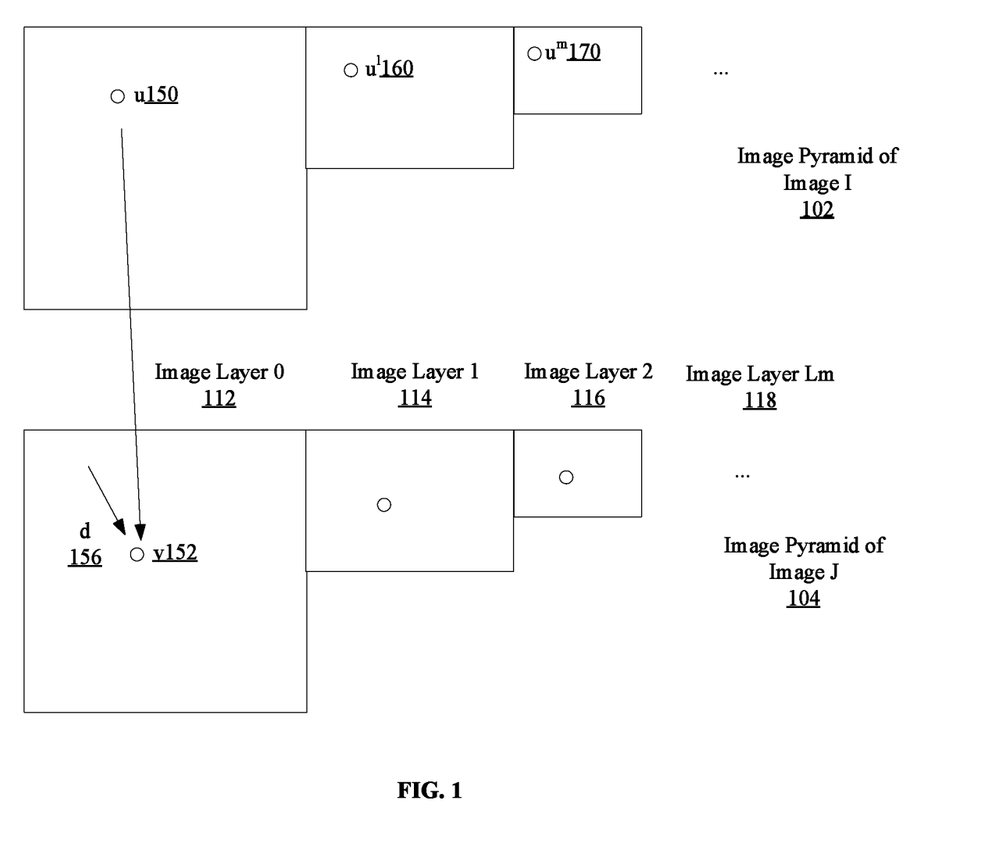
FIG. 1 is a diagram of an image pyramid according to an embodiment of the present disclosure.

FIG. 1 illustrates an image pyramid of a first image (i.e., image I) and a second image (i.e., image J) according to an embodiment of the present disclosure. As shown in FIG. 1, an image pyramid 102 of image I and an image pyramid 104 of image J have m+1 image layers, wherein m is an integer no less than 0.

At 112, the bottom layer of the image pyramid is image layer 0, which may the highest resolution of image I and image J. For example, the highest resolution of image I and image J may be the highest resolution of the original image of image I and image J, respectively.

In some embodiments, image layer 0 of image I and image J may include pixel value of some or all of the pixel positons of image I and image J, respectively. In some embodiments, the pixel value may be the gray value of image I and image J. In some embodiments, the pixel value may also include the brightness of the pixel position.

In some embodiments, the pixel values of the pixel positions in image I and image J may be expressed as I(x,y) and J(x,y), respectively, where x and y are pixel coordinates of the pixel position.

For example, for image layer 0, the pixel coordinate vector of the upper left-hand corner can be expressed as $[0\ 0]^T$, the width and height of image I and image J are the same, and can be expressed as $n_x$ and $n_y$ (both are integers greater than 0). The pixel coordinate vector in the lower right-hand corner can be expressed as $[n_{x-1}\ n_{y-1}]^T$. It should be understood that image I and image J may not have the same height and width, and the height and width of image I and image J are assumed to be the same here merely for the convenience of description.

In some embodiments, the image pyramid of image I and image J may be established progressively. For example, image layer 1 can be calculated based on image layer 0, image layer 2 can be calculated based on image layer 1, and so on. In some embodiments, the image layers of the pyramid can be established from bottom to top by smoothing or down sampling.

For example, L (where L=1, 2, . . . ) may represent the number of layers of the pyramid, $I^{L-1}$ may be the image of the L-1 layer, $nx^{L-1}$ and $ny^{L-1}$ may be the width and height of the $I^{L-1}$ layer, respectively. The image layer $I^L$ can be obtained based on the following formula:

$$I^L(x, y) = \frac{1}{4}I^{L-1}(2x, 2y) + \frac{1}{8}(I^{L-1}(2x-1, 2y) + I^{L-1}(2x+1, 2y) + I^{L-1}(2x, 2y-1) + I^{L-1}(2x, 2y+1)) + \frac{1}{16}(I^{L-1}(2x-1, 2y-1) + I^{L-1}(2x+1, 2y+1) + I^{L-1}(2x-1, 2y+1) + I^{L-1}(2x+1, 2y+1)) \quad \text{Formula (1)}$$

It should be understood that the method for determining the image layer using Formula (1) mentioned above is only one implementation manner, and other implementation manners may be used in the embodiment of the present disclosure.

For example, the value of a 3×3 kernel weight matrix sampled by Formula (1) can be changed, or a weight matrix of 5×5 or 7×7 can also be used.

By using smoothing and/or down sampling, layer L may include approximately ¼ of the pixel position of layer L-1. For example, for an image of size 1920×1024 ($I^0$ may have the same size), the image layers $I^1$, $I^2$, $I^3$, and $I^4$ may be 960×512, 480×256, 240×128, and 126×64, respectively. For the image J of size 1920×1024, the images $J^1$, $J^2$, $J^3$, and $J^4$ may have the same size, respectively. Subsequently, the image pyramid of image I and image J may be formed by using recursive processing. The image pyramid may include 2-10 layers. In FIG. 1, image pyramids 102 and 104 have the same number of layers, including layer 0 at 112, layer 1 at 114, layer 2 at 116, and a top layer $Lm^0$ at 118.

In some embodiments, the pixel positions of the feature points at different layers may be determined based on a recursive method of creating an image pyramid of the image. For example, based on Formula (1), $u^1$ 160 may be identified in layer 1 and $u^2$ may be identified in layer 2 until the pixel positions of the feature points in at all layers are obtained.

It should be understood that Formula (1) illustrates a method of establishing the image pyramid by using a down sampling method, and the image pyramid in the embodiment of the present disclosure can also be established by using other down sampling and smoothing methods. For example, a Gaussian pyramid, a Laplacian pyramid, and a controllable pyramid can also be established. The embodiment of the present disclosure does not limit the method in which the pyramids of image I and/or image J are established.

Once the image pyramids of image I and image J are established, feature tracking may be performed. For example, feature tracking can start from the highest level of image I and image J, and the highest result may include optical flow information. The result may be used for feature tracking of the next layer. The recursive processing may continue until the optical flow value of $d=[d_x \ d_y]^T$ at layer 0 is obtained. As such, as shown in FIG. 1, the feature point in image J is identified as $v=u+d$.

The manner in which the image pyramids may be established based on an embodiment of the present disclosure has been described above with reference to FIG. 1. The following describes the storage and use of the established image pyramid in conjunction with a feature tracking system shown in FIG. 2 by taking feature tracking as an example.

Figure 2:
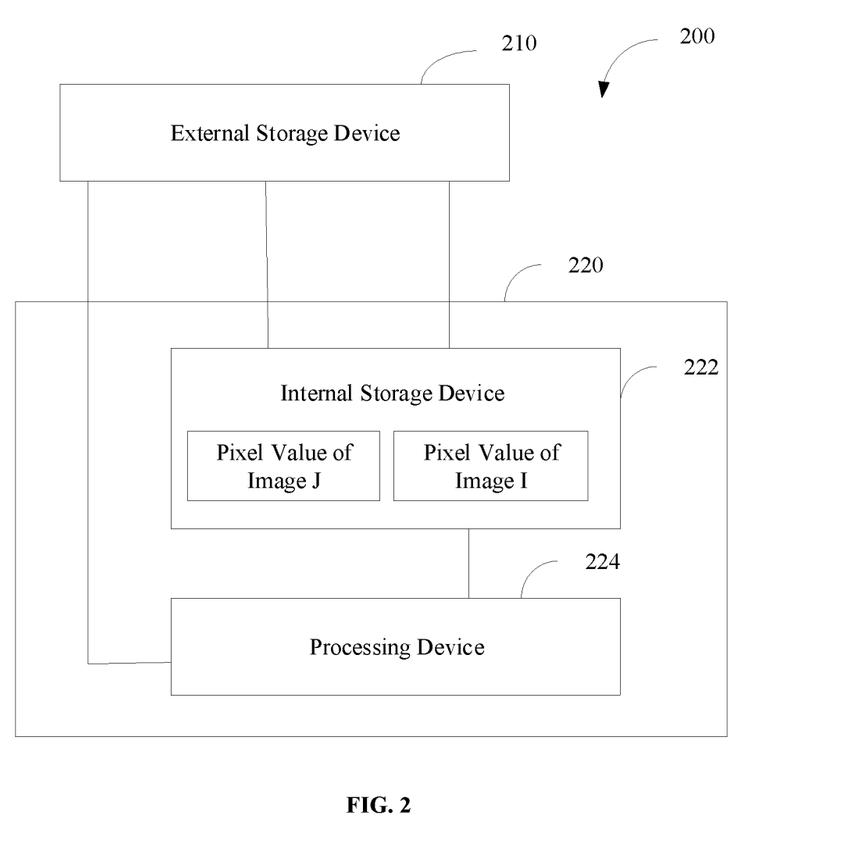
FIG. 2 is a block diagram of a feature tracking system according to an embodiment of the present disclosure.

FIG. 2 illustrates a feature tracking system 200 based on an embodiment of the present disclosure. As shown in FIG. 2, the feature tracking system 200 includes an external storage device 210 and an optical flow tracking device 200. The optical flow tracking device 220 may include an internal storage device 222 and a processing device 224. Each or a combination of the internal storage device 222 and processing device 224 can be implemented by at least one electronic circuit. The optical flow tracking device 220 may be referred to as a visual/graphic accelerator, or simply as an accelerator.

In some embodiments, in the embodiment of the present disclosure, the processing device 224 can be implemented by an integrated logic circuity of hardware or instructions in the form of a software. The processing device 224 may be a general-purpose processor, a digital signal processor (DSP), an application specific integrated circuit (ASIC), a field programmable gate array (FPGA) or other programmable logic devices, a discrete gate or transistor logic device, or a discrete hardware component.

The optical flow tracking device 220 can be connected to the external storage device 210. The external storage device 210 can store an image pyramid (also referred to as image pyramid data) for each image of at least one image. The external storage device 210 can be large enough to store a plurality of image pyramids.

For the simplicity of description, the following is an example of image tracking from a first image to a second image. In particular, the first image may be referred to as image I, and the second image may be referred to as image J. For feature tracking of a plurality of tracking points in image I in image J, matching pixel points of the plurality of feature points in the image J may be identified by using the embodiment of the present disclosure. The embodiment of the present disclosure can also be applied to other tracking scenes instead of featuring tracking from image I to image J. For example, the embodiment of the present disclosure may be applied to feature tracking from a first image to a series of other images, or from a video frame to one or more video frames.

The external storage device 210 can be connected or in communication with the internal storage device 222. The internal storage device 222 may include a smaller storage device than the external storage device 210 for feature tracking and storage of partial pyramid data from the external storage device 210. In some embodiments, once the image pyramid is generated, one or more layers of the image pyramid data may not be stored in the external storage device 210 but stored directly in the internal storage device 222. The internal storage device 222 can store data from different image pyramids at different locations in the internal storage device 222.

The external storage device 210 and the internal storage device 222 may include one or more of a variety of dynamic random-access memory (DRAM), such as a dual data rate synchronous DRAM (DDR DRAM or DDR for short), a single data rate RAM (SDRAM), a static RAM (SRAM), a persistent mass storage device (e.g., a flash memory, a disk, etc.), a persistent storage (e.g., a phrase change memory (PCM), a memristor, a spin-transfer torque (STT) RAM).

In some embodiments, the external storage device 220 may include DDR and SDRAM to store pyramid data.

In some embodiments, the internal storage device 222 may include a cache to store image pyramid data (e.g., partial image pyramid data acquired form the external storage device 210, or one or more layers of image pyramid when the image pyramid is generated).

Although the external storage device 210 may be shown external to the optical flow tracking device 220, in some embodiments, the external storage device 210 can also be implemented inside the optical flow tracking device 220. For example, the optical flow tracking device 220 can also be implemented on a chip system that includes the external storage device 210.

A part of the image pyramid data in the internal storage device 222 may be provided to the processing device 224, and the processing device 224 may be configured to perform an optical flow tracking algorithm.

In some embodiments, the processing device 224 may be configured to determine pixel information that needs to be read and provided to the internal storage device 222, and the internal storage device 222 can provide the correct image pyramid data to the processing device 224 based on the pixel information.

In some embodiments, the processing device 224 can also provide the pixel information to the internal storage device 222 such that the internal storage device 222 may request the retrieve the correct image pyramid data from the external storage device 210 based on the pixel information In some embodiments, the processing device 224 may be configured to perform an iterative calculation of the image pyramid data, and the feature point tracking system may acquire the matching points in the image J with the plurality of feature points in image I.

In some embodiments, the processing device can perform the optical flow tracking algorithm using the Kanade-Lucas-Tomasi (KLT) algorithm.

Figure 3:
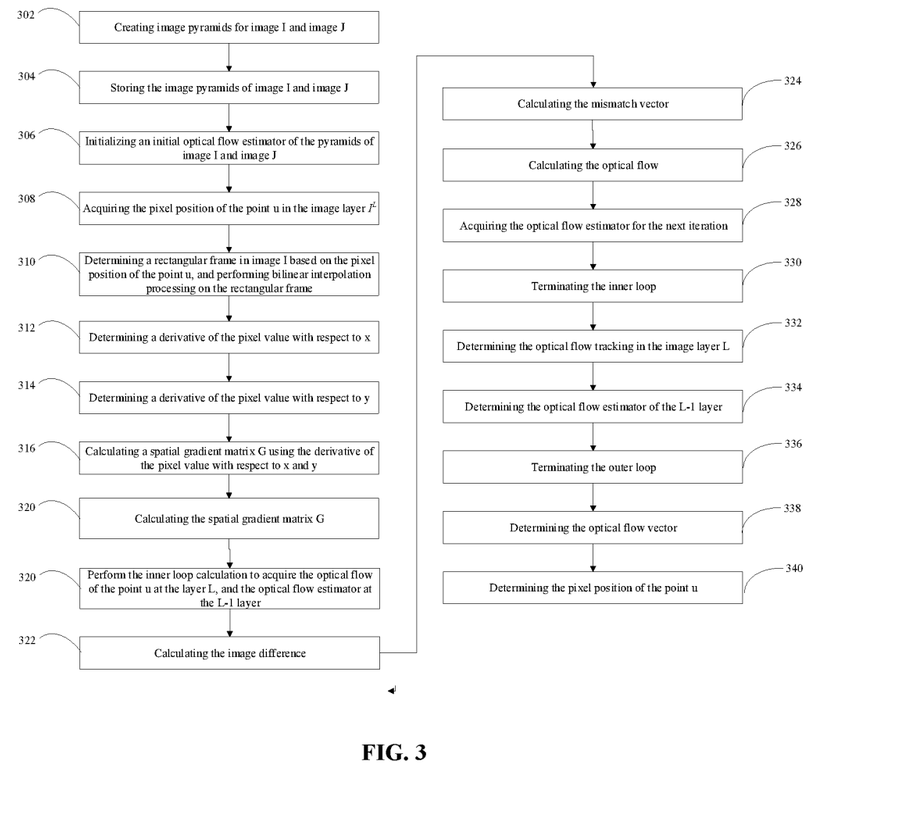
FIG. 3 is a diagram of an image tracking method according to an embodiment of the present disclosure.

For the ease of understanding, the following uses the pseudo codes when in FIG. 3 to describe the implementation of optical flow tracking using the KLT algorithm as an example.

FIG. 3 illustrates a diagram of a feature point tracking method 300. The purpose of the method 300 is to find the corresponding position in the image J for a point u in image I.

302, creating image pyramids for image I and image J. The image pyramids of image I and image J can be established using the method described in FIG. 1. The image pyramids of image I and image J can be expressed as $\{I^L\}_{L=0,\ldots,L_m}$ and $\{J^L\}_{L=0,\ldots,L_m}$, respectively.

304, storing the image pyramids of image I and image J.

306, initializing an initial optical flow estimator of the pyramids based on Formula (2).

$$g^{L_m}=[g_x^{L_m} \ g_y^{L_m}]^T=[0 \ 0]^T \quad \text{Formula (2)}$$

The update of the initial optical flow estimator at each layer is described below.

308, starting an outer loop. In the outer loop, starting from the highest level, an iterative process may be performed in each layer in a descending order until the bottom layer is reached. In each iterative process, the pixel position of the point u at the corresponding layer can be determined.

310, acquiring the pixel position of the point u in the image layer $I^L$. Image $I^L$ is the Lth layer of the image pyramid of image I, and in image $I^L$, the position of point u can be determined based on the method described in FIG. 2. In some embodiments, in image $I^L$, the pixel position of the point u can be acquired using Formula (3), wherein $u^0$=u:

$$u^L=[p_x\ p_y]^T=u/2^L \qquad \text{Formula (3)}$$

312, determining a rectangular frame in image I based on the pixel position of the point u, and performing bilinear interpolation processing on the rectangular frame, where the size of the rectangular frame may be $(2\omega_x+4)\times(2\omega_y+4)$.

Figure 4:
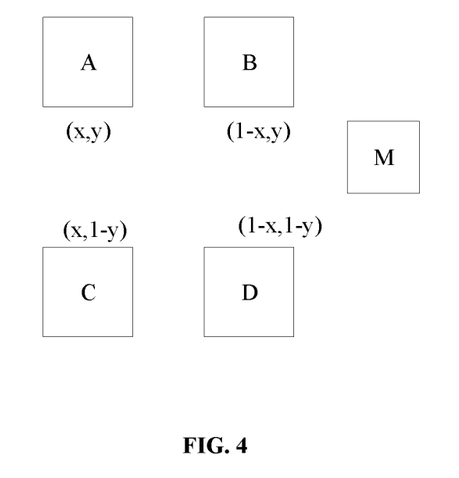
FIG. 4 is a diagram of bilinear interpolation calculations according to an embodiment of the present disclosure.

For example, as shown in FIG. 4, bilinear interpolation processing is performed on the pixel values of a pixel A, a pixel B, a pixel C, and a pixel D in the rectangular frame to acquire the pixel value at a point M.

The pixel value of the point M may be determined as M=(1−x)(1−y)*A+x*(1−y)*B+y*(1−x)*C+x*y*D, where A, B, C, and D represent the pixel values of the pixel A, B, C, and D, respectively.

In some embodiments, x and y may be the fractional part of the coordinates of the center point of the currently processed rectangular, where the rectangular frame size after the bilinear interpolation processing may be $(2\omega_x+3)\times(2\omega_y+3)$.

314, determining a derivative of the data (the pixel value after the interpolation) with respect to x in the rectangular frame after the bilinear interpolation processing. In some embodiments, the derivative of x can be calculated based on Formula (4).

$$I_x(x,y) = \frac{I^L(x+1,y)-I^L(x-1,y)}{2} \qquad \text{Formula (4)}$$

316, determining a derivative of the data (the pixel value after the interpolation) relative to y in the rectangular frame after the bilinear interpolation processing. In some embodiments, the derivative of y can be calculated based on Formula (5).

$$I_y(x,y) = \frac{I^L(x,y+1)-I^L(x,y-1)}{2} \qquad \text{Formula (5)}$$

As can be seen from Formula (4) and Formula (5) above, the rectangular frame needed to calculate the derivate x and y may be $2\omega_x+1)\times(2\omega_y+1)$. In the following description, for distinction, the rectangular frame of $(2\omega_x+1)\times(2\omega_y+1)$ may be referred to as a sub-rectangular frame.

318, calculating a spatial gradient matrix G using the derivative of the pixel value with respect to x and y. In some embodiments, the matrix G can be calculated using Formula (6).

$$G = \sum_{x=p_x-\omega_x}^{p_x+\omega_x}\sum_{y=p_y-\omega_y}^{p_y+\omega_y}\begin{bmatrix} I_x^2(x,y) & I_x(x,y)I_y(x,y) \\ I_x(x,y)I_y(x,y) & I_y^2(x,y) \end{bmatrix} \qquad \text{Formula (6)}$$

For a given layer L, optical flow tracking may be performed using an iterative KLT optical flow tracking algorithm using an inner loop. In particular, before starting the inner loop, assuming a pixel displacement based on Formula (7).

$$\overline{v}^0=[0\ 0]^T \qquad \text{Formula (7)}$$

320, performing the inner loop calculation to acquire the optical flow of the point u at the layer L, and the optical flow estimator at the L-1 layer. The inner loop can be executed a predetermined number of times K or until the calculated optical flow is sufficiently small.

322, calculating an image difference for a given k in [1 K]. For a given k, the image difference can be calculated using Formula (8).

$$\delta I_k(x,y)=I^L(x,y)-J^L(x+g_x^L+v_x^{k-1},y+g_y^L+v_y^{k-1}) \qquad \text{Formula (8)}$$

Before 322, the rectangular frame of the image J can be determined and bilinear interpolation processing can be performed on the rectangular frame to acquire the pixel value $J^L(x,y)$ of the pixel in the rectangular frame after the interpolation processing. The manner of the bilinear interpolation processing can refer to the processing of the rectangular frame of the image I above.

324, calculating a mismatch vector of the image based on the image difference. In some embodiments, for a given k, the mismatch vector of the image can be calculated using Formula (9).

$$\overline{b}_k = \sum_{x=p_x-w_x}^{p_x+p_y}\sum_{x=p_y-w_y}^{p_y+w_y}\begin{bmatrix} \delta I_k(x,y)I_x(x,y) \\ \delta I_k(x,y)I_y(x,y) \end{bmatrix} \qquad \text{Formula (9)}$$

326, calculating the optical flow $\overline{\eta}^k$ based on the spatial gradient matrix G at 318 and the image mismatch vector at 324. In some embodiments, the optical flow can be calculated using Formula (10).

$$\overline{\eta}^k=G^{-1}\overline{b}_k \qquad \text{Formula (10)}$$

328, terminating the operation for k, if an inner loop condition is not satisfied, perform the next iteration. That is, for the operation of k+1, repeat the operation of 322 to 328. In particular, the optical flow $\overline{\eta}^k$ can be used for the of k+1 iteration. In some embodiments, the optical flow estimator of k can be calculated using Formula (11).

$$\overline{v}^k=\overline{v}^{k-1}+\overline{\eta}^k \qquad \text{Formula (11)}$$

330, determining the termination of the inner loop of layer L.

332, determining the optical flow tracking in the image layer L in response to the inner loop condition is satisfied. In some embodiments, optical flow of layer L can be acquired using Formula (12)

$$d^L=\overline{v}^K \qquad \text{Formula (12)}$$

334, determining the optical flow estimator of the L-1 layer. In some embodiments, the optical flow estimator can be acquired using Formula (13).

$$g^{L-1}=[g_x^{L-1}\ g_y^{L-1}]^T=2(g_L+d^L) \qquad \text{Formula (13)}$$

336, completing the outer loop at the layer L. In particular, continuing the operation of the next layer (e.g., the L-1 layer) is to repeatedly perform the operation of 310 to 334 repeatedly.

338, determining an optical flow vector. Once an outer loop condition at 308 is satisfied, that is, the calculation of the bottom layer (i.e., the calculation at layer 0) has been completed. As such, the final optical flow vector d at layer 0 can be acquired based on the optical flow estimator at layer 0 and the optical flow at layer 0. In some embodiments, the final optical flow vector can be calculated using Formula (14).

$$d=g^0+d^0 \quad \text{Formula (14)}$$

340, determining the matching point of the feature point u in image I in image J based on the final optical flow vector. In some embodiments, the pixel position of the matching point u can be acquired using Formula (15).

$$v=u+d \quad \text{Formula (15)}$$

From the description of the KLT algorithm above, it can be seen that when the inner loop is used to determine the optical flow estimator of image J at a certain layer, a large amount of multiplication is needed.

For example, multiplication processing is needed for the bilinear interpolation processing performed on the rectangular frame in image I and the rectangular frame in image J; three multiplication operations of $I_x^2(x,y)$, $I_y^2(x,y)$, and $I_x(x,y)I_y(x,y)$ are needed when calculating the matrix G; and two multiplication operations of $\delta I_k(x,y)I_x(x,y)$ and $\delta I_k(x,y)I_y(x,y)$ are needed when calculating the image mismatch vector.

If the KLT algorithm is implemented using hardware circuits (e.g., FPGAs and ASICs), the multiplication operation may need to use more multipliers.

For example, assuming that the rectangular frame after the interpolation process is 15×15, and the above multiplication operations all use multipliers, for a bilinear interpolation processing, at least 4 multipliers are needed to obtain a value, and at least 15×4=60 multipliers are needed for one line of calculation. Further, since the bilinear interpolation processing needs to be performed on the rectangular frames of image I and image J, respectively, and more multipliers may be needed.

In view of the above, the following technical solutions are provided in the embodiment of the present disclosure. However, it should be understood that the technical solutions provided below can also be implemented by other algorithms than the KLT algorithm.

Figure 5:
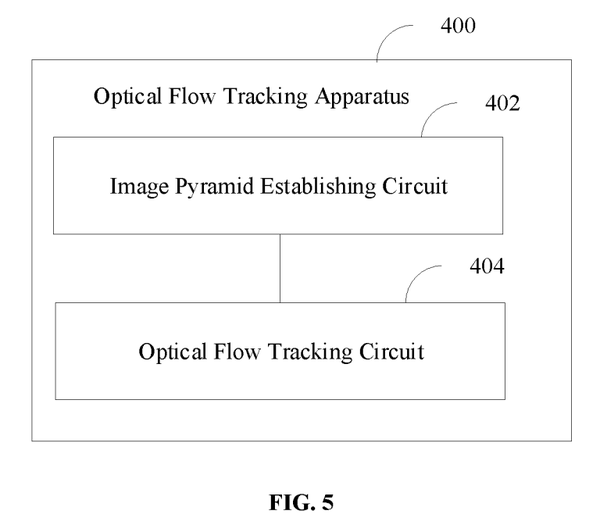
FIG. 5 is a diagram of the image tracking method according to an embodiment of the present disclosure.

FIG. 5 is a block diagram of an optical flow tracking apparatus 400 according to an embodiment of the present disclosure. As shown in FIG. 5, the optical flow tracking apparatus includes an image pyramid establishing circuit 402 and an optical flow tracking circuit 404.

In some embodiments, the optical flow tracking apparatus 400 can implement the corresponding operations of the optical flow tracking device 200 shown in FIG. 2.

In some embodiments, the optical flow tracking apparatus 400 may include an internal storage device as shown in FIG. 2.

In some embodiments, the optical flow tracking apparatus 400 may be connected to an external storage device as shown in FIG. 2.

The image pyramid establishing circuit 402 may be configured to establish a first image pyramid of the first image and a second image pyramid of the second image, where in the first image pyramid may include at least one image layer, and the second image pyramid may include at least one image layer. The image pyramid establishing circuit 402 may be configured to perform an optical flow tracking processing on the $k^{th}$ layer in the first image pyramid and the $k^{th}$ layer in the second image pyramid to acquire an optical flow estimator of the second image in the $k^{th}$ image layer, where k may be an integer. Further, the optical flow estimator of the second image in the $k^{th}$ image layer may be used to calculate the optical flow of the second image.

The initial value used in the calculation of the optical flow estimator of the second image in the $k^{th}$ image layer may be the optical flow estimator of the k-$1^{th}$ image layer (at this point, k is not the top layer of the image layers), and the optical flow estimator of the second image in the $k^{th}$ image layer may be used as the initial value to obtain the optical flow estimator of the k+$1^{th}$ image layer (at this point, k is not the bottom layer in the image layers). The process may continue until the optical flow of the second image is acquired. For the specific implementation, reference may be made to the description shown in the method 300.

In some embodiments, after acquiring the optical flow of the second image, the position of the pixel u in the first image and the optical flow may be combined to calculate the position of the point u in the second image.

In some embodiments, the optical flow tracking apparatus can implement the optical flow tracking algorithm using the KLT algorithm.

In some embodiments, in the multiplication processing of the optical flow tracking processing, a plurality of multipliers that multiply the data corresponding to the image layers of the first image pyramid and/or the second image pyramid may have the following characteristics in which each of the plurality of multipliers may be multiplied in series on a plurality of clocks, and the plurality of multipliers may be multiplied in parallel on the same clocks.

In some embodiments, each of the plurality of multipliers performing multiplication of the plurality of clocks in series may be that each multiplier is processing different data at different clocks or performing multiplication processing in different processing operations (e.g., a first bilinear interpolation processing, a second bilinear interpolation processing, a calculation of the matrix G, or a calculation of the image mismatch vector) in different clocks.

In some embodiments, different multipliers of the plurality of multipliers may process different data at the same clock.

This means that in the process of optical flow tracking using the image pyramids, for the multiplication processing, the same multiplier in different clocks can multiply in series, or multiple multipliers can work in parallel on the same clock. As such, low system performance by using a multiplier for all multiplications may be avoided, and the use of too many multipliers for the multiplication processing resulting in consuming additional system hardware resources may be avoided, thereby avoiding the limitations on subsequent system upgrades and maintenance. Therefore, the embodiment of the present disclosure realizes the full utilization of the system resources and facilitates the subsequent system upgrade and maintenance without affecting the system performance.

In some embodiments, the processing speed of the plurality of multipliers may match the delay of the device reading data from the off-chip storage system.

More specifically, when the optical flow tracking apparatus reads data from the off-chip storage system, a certain delay may be needed, and the processing speed of the plurality of multipliers can match the delay. In particular, the processing speed of the plurality of multipliers can be determined by the number of the multipliers and the performance of the multiplier. In some embodiments, when the optical flow tracking apparatus reading data from the off-chip storage system is relatively slow, a fewer number of multipliers and/or multipliers with lower performance may be used; and when the optical flow tracking apparatus reading data from the off-chip storage system is relatively fast, more multipliers and/or multipliers with higher performance may be used.

As such, in the embodiment of the present disclosure, the processing speed of the multipliers can be matched with the delay of the optical flow tracking apparatus reading data from the off-chip storage system to achieve a more reasonable system layout, and avoid the challenge in subsequent system upgrade and maintenance caused by excessive multipliers when data reading is relatively slow, and avoid the reduction in system performance caused by insufficient multipliers capability when data reading is relatively fast.

In some embodiments, the number of the multipliers in the system may match the performance of the control logic of the system. For example, if the number of the multipliers is low, the performance of the control logic of the system may be better (e.g., the control logic may be more complicated). During product design, the number of the multipliers can be matched with the complexity of the control logic based on the specific situation.

In some embodiments, the optical flow tracking circuit 404 may be configured to perform a first bilinear interpolation processing on the first rectangular frame of the $k^{th}$ image layer in the first image pyramid; calculate a derivative of each data with respect to x and y of the first sub-rectangular frame in the first rectangular frame by using the first rectangular frame after the interpolation processing; calculate the matrix G by using the derivative of each data in the first sub-rectangular frame with respect to x and y; perform a second bilinear interpolation processing o the second rectangular frame of the $k^{th}$ image layer in the second image pyramid to acquire a second rectangular frame after the interpolation processing; determine the image difference between the first rectangular frame after the interpolation processing and the second rectangular frame after the interpolation processing; determine the image mismatch vector between the first rectangular frame after the interpolation processing and the second rectangular frame after the interpolation processing based on the image difference; and calculate the optical flow estimator of the second image in the $k^{th}$ image layer based on the image mismatch vector and the matrix G.

For the manner in which the optical flow tracking circuit 404 determines the optical flow estimator, reference may be made to the description of the method 300 provided above. However, it should be understood that the manner in which the optical flow tracking circuit 404 determines the optical flow estimator is not limited thereto.

In some embodiments, the optical flow tracking circuit 404 may be configured to update the second rectangular frame and perform a bilinear interpolation processing on the updated second rectangular frame to redetermine the optical flow estimator in response to the optical flow estimator acquired by using the second rectangular frame after the previous interpolation processing not satisfying a first predetermined value, or the number of times of the iterative calculation of the optical flow estimator not satisfying a second predetermined value.

For example, as in method 300, in response to the inner loop not satisfying the condition (e.g., the acquired optical flow estimator is not lower than the predetermined value or the number of the inner loops does not reach the predetermined value), the rectangular frame of the image J may be updated, and the updated rectangular frame may be subject to the bilinear interpolation processing to recalculate the optical flow estimator of the image J in the $k^{th}$ image layer.

In some embodiments, the optical flow tracking circuit 404 may include a first multiplier group including a plurality of first multipliers, and the first rectangular frame after the interpolation processing may include a plurality of first data.

The first multiplier group may be configured to perform the multiplication processes in the first bilinear interpolation processing. In some embodiments, different multipliers of the plurality of first multipliers may be used to respectively perform the multiplication processing of different first data in the plurality of first data (the first data may be the data in the first rectangular frame after the interpolation processing, and FIG. 3 illustrates the rectangular frame of $(2\omega_x+3) \times (2\omega_y+3)$ of the method 300) on the same clock, and acquire the multiplication processing of the plurality of the first data by performing the first bilinear interpolation processing using the plurality of clocks.

More specifically, the number of the multipliers in the first multiplier group may be the same as the number of data included in one row of the first rectangular frame after the interpolation processing, or the same as the number of data included in one column of the first rectangular frame after the interpolation processing. For example, for a rectangular frame with the size of 15×15 after the interpolation processing, the first multiplier group may include 15 multipliers. As such, the first multiplier group can process one row or one column in one clock, and the bilinear interpolation processing can be completed by multiple clock s for each row or each column. For example, if the bilinear interpolation processing needs 4 multiplication processing, the bilinear interpolation processing for one row or one column can be completed in 4 clocks.

Of course, the number of the multipliers in the first multiplier group may also be the same as the number of half-line data or the number of multi-line data in the rectangular frame after the interpolation processing.

In some embodiments, the optical flow tracking circuit 404 may include a second multiplier group including a plurality of second multipliers, and the second multiplier group may be configured to perform the multiplication processing needed to calculate the matrix G. In some embodiments, different multipliers of the plurality of second multipliers may be used to respectively perform the multiplication processing for different second data in the plurality of second data on the same clock, and complete the plurality of multiplication processing of the plurality of second data using the plurality of clocks. In particular, the multiplication processing for the second data may be a multiplication processing of the derivative of the second data with respect to x and/or y.

More specifically, the number of the multipliers in the second multiplier group may be the same as the number of the values included in one row of the first sub-rectangular frame in the first rectangular frame after the interpolation processing, or the same as the number of values included in one column of the first sub-rectangular frame in the first rectangular frame after the interpolation processing. For example, for a sub-rectangular frame of the size 15×15, the first multiplier group can include 15 multipliers. As such, the first multiplier group can process one row or one column in one clock, and the calculation of the matrix G can be completed by a plurality of clocks for each row or column. For example, if the calculation of the matrix G needs 3 multiplication processing (e.g., $I_x^2(x,y)$, $I_y^2(x,y)$, and $I_x(x,y)I_y(x,y)$), the calculation for one row or one column may be completed in 3 clocks.

Of course, the number of the multipliers in the second multiplier group may also be the same as the number of half-line data or the number of multi-line data in the first rectangular frame.

In some embodiments, the multiplier group used to acquire the first rectangular frame after the interpolation processing may not be the same multiplier group used to calculate the matrix G.

More specifically, since the sub-rectangular frame in the rectangular frame after the interpolation processing is used for the calculation of the matrix G, and the calculation between the values of the rows (or columns) in the sub-rectangular frame may not be relative, the multiplier group used to acquire the first rectangular frame after the interpolation processing may not be the same multiplier group used to calculate the matrix G. As such, the bilinear interpolation processing of the first rectangular frame and the calculation of the matrix G may be performed in parallel, thereby saving speed.

Further, since the number of multiplication processes needed to calculate the matrix G for each second data may be different from the number of multiplication processes needed to perform the first bilinear interpolation processing, for example, the number of multiplications needed to calculate the matrix G may be less than the number of multiplications needed to perform the first bilinear interpolation processing, the number of multipliers needed to calculate the matrix G may be different from the number of multipliers needed to perform the first bilinear interpolation processing. For example, the number of multipliers needed to calculate the matrix G may be less than the number of multipliers needed to perform the first bilinear interpolation processing.

It should be understood that the first sub-rectangular frame may also be understood as a part of having no data. For example, the partial position of the first rectangular frame may form the first sub-rectangular frame, and the derivative with respect to x and y corresponding to each position in the first sub-rectangular frame may be acquired by the pixel of neighboring position in the first rectangular frame.

In some embodiments, the optical flow tracking circuit 404 may include a third multiplier group. The third multiplier group may be configured to perform the multiplication processing in the second bilinear interpolation processing and include a plurality of third multipliers. Further, the second rectangular frame after the interpolation processing may include a plurality of third data.

In some embodiments, different multipliers of the plurality of second multipliers may be used to respectively perform the multiplication processing for different second data in the plurality of second data on the same clock, and complete the plurality of multiplication processing of the plurality of second data using the plurality of clocks In some embodiments, the multiplier group used for the second bilinear interpolation processing and the multiplier group used to calculate the matrix G may not be the same multiplier group; and/or, the multiplier group used for the second bilinear interpolation processing and the multiplier group for the first bilinear interpolation processing may not be the same multiplier group.

More specifically, since the second bilinear interpolation processing does not correspond to the calculation of the matrix G, the multiplier used for the second bilinear interpolation processing and the multiplier used to calculate the matrix G may not be the same multiplier. As such, the second bilinear interpolation processing and the calculation of the matrix G may be performed in parallel, thereby improving the system processing speed.

Similarly, since the second bilinear interpolation processing does not correspond to first bilinear interpolation processing, the multiplier used for the second bilinear interpolation processing may not be the same multiplier used for the first bilinear interpolation processing. As such, the second bilinear interpolation processing and the first bilinear interpolation processing may be performed in parallel, thereby improving the system processing speed.

In some embodiments, the number of the multipliers included in the multiplier group for performing the second bilinear interpolation processing may be greater than the number of the multipliers included in the multiplier group for calculating the matrix G, and/or the number of the multipliers included in the multiplier group for performing the first bilinear interpolation processing.

More specifically, since the purpose is to identify a target pixel in the second image when performing the optical flow tracking, it may be necessary to update the second rectangular frame multiple times to achieve the condition of terminating the inner loop of a layer as shown in method 300. As such, the number of multiplications needed to perform the second bilinear interpolation processing may be large. Therefore, the number of the multipliers for performing the second bilinear interpolation processing may be greater when compared with the number of the multipliers for performing the first bilinear interpolation processing or the number of the multipliers for calculating the matrix G. As such, the time spent on waiting for the calculation of the second image to complete after the calculation of the first image is completed can be avoided when calculating the image mismatch vector.

In the embodiment of the present disclosure, compared to the first bilinear interpolation processing and the calculation of the matrix G, more multipliers (e.g., a single point of 2 or 4 multipliers) may be used when performing the second bilinear interpolation processing to acquire a single data, or more multipliers may be used in parallel to acquire more data.

In some embodiments, the optical flow tracking circuit 404 may include a fourth multiplier group including a plurality of fourth multipliers. Different multipliers of the plurality of fourth multipliers may be used to perform the multiplication processing of different data groups in the plurality of data groups on the same clock, and acquire the image mismatch vector by using a plurality of clocks to perform the multiplication processing needed on the plurality of data groups. In some embodiments, a data group may include a first data in the first rectangular frame after the interpolation processing, and a second data in the second rectangular frame after the interpolation processing that matches the first data, and an image difference that matches the first data.

For example, in the method 300 shown in FIG. 3, each data group may include $\delta I_k(x,y)$, $I_x(x,y)$, and $I_y(x,y)$, and the multiplication processing for the data group may be $\delta I_k(x,y)I_x(x,y)$ and $\delta I_k(x,y)I_y(x,y)$.

In some embodiments, the number of the multipliers included in the fourth multiplication group may be the same as the number of data included in one row or one column of the rectangular frame after the interpolation processing.

In some embodiments, the multiplier group for acquiring the mismatch vector may include at least one of a multiplier group for performing the first bilinear interpolation processing, a multiplier group for performing the second bilinear interpolation processing, and a multiplier group for calculating the matrix G.

More specifically, while performing the calculation of the mismatch vector, the multiplier group for performing the first bilinear interpolation processing, the multiplier group for performing the second bilinear interpolation processing, and the multiplier group for calculating the matrix G may all be in an idle state, at least one of the multiplier group may be used to calculate the mismatch vector. As such, the system resources can be fully utilized to facilitate the subsequent system upgrade and maintenance without affecting the system performance.

Figure 6:
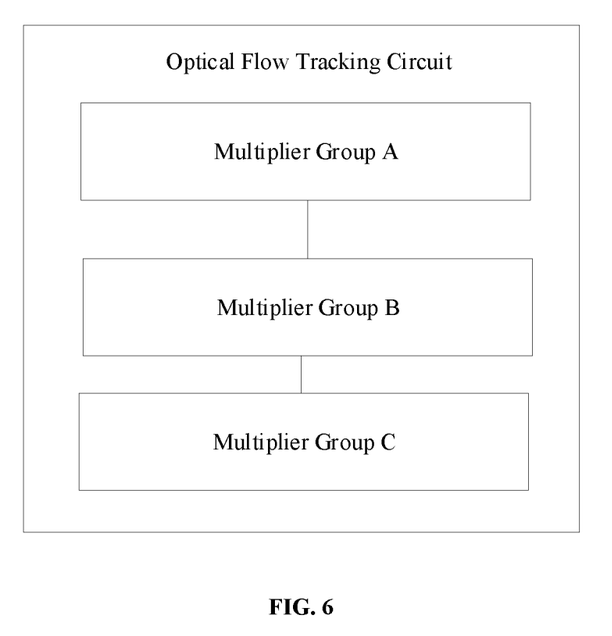
FIG. 6 is a connection diagram of a multiplier group in the image tracking apparatus according to an embodiment of the present disclosure.

For example, as shown in FIG. 6, the optical flow tracking circuit includes a multiplier group A, a multiplier group B, and a multiplier group C. The multiplier group A may be used to perform the first bilinear interpolation processing, the multiplier group B may be used to perform the second bilinear interpolation processing, and the multiplier group C may be used to perform the calculation of the matrix G. Further, the calculation of the image mismatch vector may be performed by any one of the multiplier group A, the multiplier group B, and the multiplier group C.

As such, by using the optical flow tracking method of the embodiment of the present disclosure, it may be possible to fully utilize the system resources to facilitate the subsequent system upgrade and maintenance without affecting the system performance.

Figure 7:
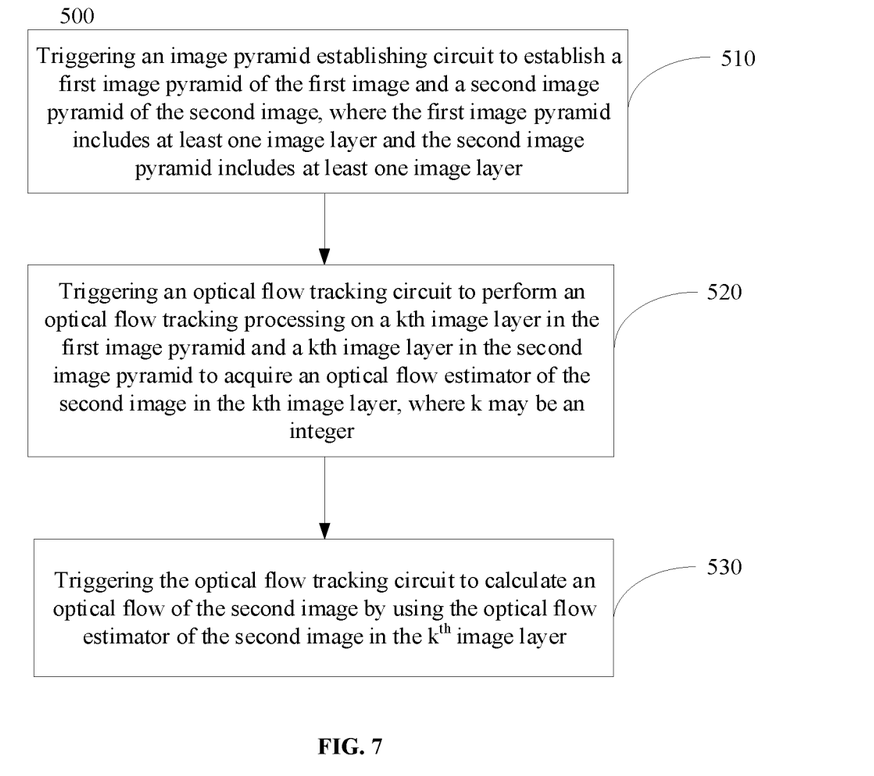
FIG. 7 is a flowchart of the image tracking method according to an embodiment of the present disclosure.

In some embodiments, when the optical flow tracking apparatus 400 is an FPGA or a similar circuit (including a programmable device), an embodiment of the present disclosure further provides an optical flow tracking method 500 as shown in FIG. 7. The method 500 is described in detail below.

510, triggering an image pyramid establishing circuit to establish a first image pyramid of the first image and a second image pyramid of the second image, where the first image pyramid includes at least one image layer and the second image pyramid includes at least one image layer.

520, triggering an optical flow tracking circuit to perform an optical flow tracking processing on a $k^{th}$ image layer in the first image pyramid and a $k^{th}$ image layer in the second image pyramid to acquire an optical flow estimator of the second image in the $k^{th}$ image layer, where k may be an integer.

In some embodiments, in the multiplication processing of the optical flow tracking processing, a plurality of multipliers may be used to perform the multiplication processing of data corresponding to the image layer of the first image pyramid and/or the second image pyramid. Further, each of the plurality of multipliers may perform the multiplication processing in a plurality of clocks in series, and different multipliers of the plurality of multipliers may perform the multiplication processing in parallel on the same clock.

530, triggering the optical flow tracking circuit to calculate an optical flow of the second image by using the optical flow estimator of the second image in the $k^{th}$ image layer.

For the implementation of the optical flow tracking method, reference may be made to the above description. For example, the implementation of the multipliers in the optical flow tracking circuit, reference may be made to the description provided above. For brevity, details are not described herein again.

Figure 8:
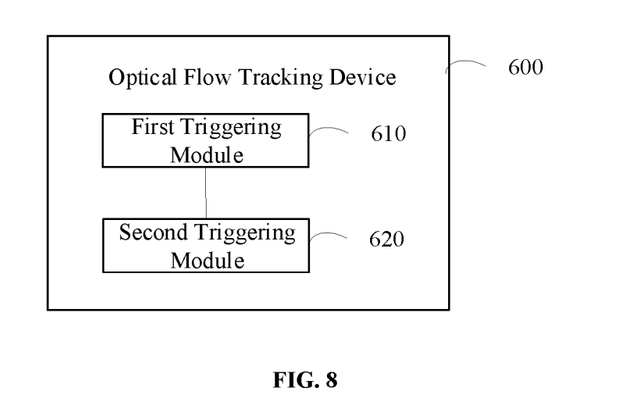
FIG. 8 is a block diagram of an image tracking apparatus according to an embodiment of the present disclosure.

For the method 500 described above, an embodiment of the present disclosure further provides an optical flow tracking device 600. As shown in FIG. 8, the optical flow tracking device 600 includes a first triggering module 610 and a second triggering module 620. The first triggering module may be configured to trigger the image pyramid establishing circuit to establish a first image pyramid of the first image and a second image pyramid of the second image, where the first image pyramid may include at least one image layer, and the second image pyramid may include at least one image layer. The second triggering module 620 may be configured to trigger the optical flow tracking circuit to perform an optical flow tracking processing on a $k^{th}$ image layer in the first image pyramid and a $k^{th}$ image layer in the second image pyramid to acquire an optical flow estimator of the second image in the $k^{th}$ image layer. Further, the second triggering module 620 may be configured to trigger the optical flow tracking circuit to calculate an optical flow of the second image by using the optical flow estimator of the second image in the $k^{th}$ image layer.

Figure 9:
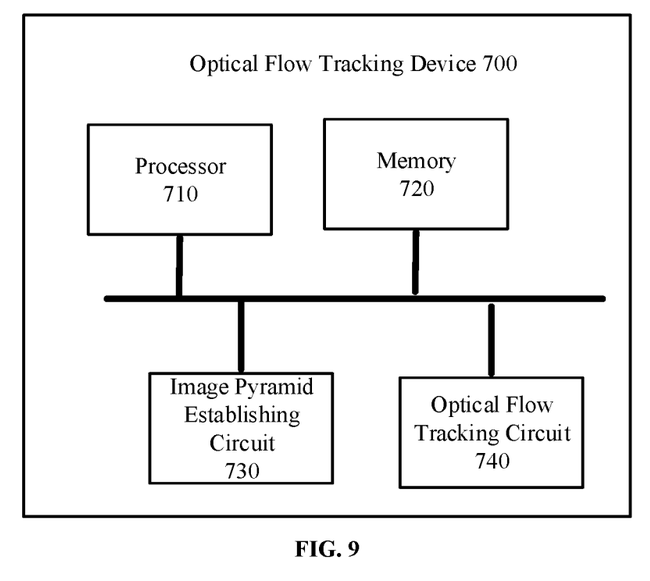
FIG. 9 is block diagram of the image tracking apparatus according to an embodiment of the present disclosure.

An embodiment of the present disclosure further provides an optical flow tracking device 700. As shown in FIG. 9, the optical flow tracking device 700 includes a processor 710, a memory 720, an image pyramid establishing circuit 730, and an optical flow tracking circuit 740. In some embodiments, the optical flow tracking device 700 may be an FPGA or a similar device.

The processor 710 may be configured to execute codes stored in the memory 720 and trigger the image pyramid establishing circuit 730 and the optical flow tracking circuit 740 to perform the optical flow tracking method described above. In addition to the codes for the processor 710 to execute, the memory 720 may store other information, such as the pyramid data.

In some embodiments, the optical flow tracking device 700 can implement the corresponding operations implemented by the optical flow tracking device described above. For brevity, details are not described herein again.

Figure 10:
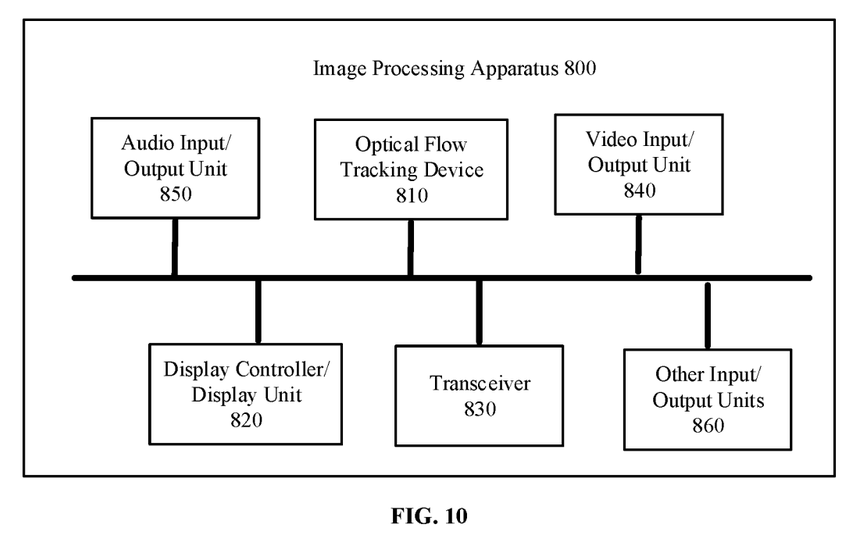
FIG. 10 is a block diagram of an image processing apparatus according to an embodiment of the present disclosure.

FIG. 10 is a block diagram of an image processing apparatus 800 according to embodiment of the present disclosure.

In some embodiments, the image processing apparatus 800 may include a number of different components that can be used as integrated circuits (ICs) or as a part of an integrated circuit, discrete electronic devices, or other modules suitable for use with a circuit board (e.g., a motherboard or an add-on board), or as a part of a computer system.

In some embodiments, the image processing apparatus 800 may include an optical flow tracking device 810.

Other than the optical flow tracking device 810, the image processing apparatus 800 may further include a display controller and/or a display device unit 820, a transceiver 830, a video input/output unit 840, an audio input/output unit 850, and other input/output units 860. The components included in the image processing apparatus 800 may be interconnected by a bus or internal connection.

In some embodiments, the transceiver 830 may be a wired transceiver or a wireless transceiver, such as a Wi-Fi transceiver, a satellite transceiver, a Bluetooth transceiver, a wireless cellular telephone transceiver, or combinations thereof.

In some embodiments, the video input/output unit 840 may include an image processing subsystem such as a video camera that includes a light sensor, a charge coupled device (CCD), a complementary metal-oxide semiconductor (CMOS) light sensor for implementing the imaging functions.

In some embodiments, the audio input/output unit 850 may include a speaker, a microphone, an earpiece, and the like.

In some embodiments, the other input/output units 860 may include storage devices, universal serial bus (USB) ports, serial ports, parallel ports, printers, network interfaces, and the like.

In some embodiments, the optical flow tracking device 810 can implement the corresponding operations implemented by the optical flow tracking device described above. For brevity, details are not described herein again.

In some embodiments, the image processing apparatus 800 may be disposed in a movable object. The movable object can be moved in any suitable environment, for example, in the air (e.g., a fixed-wing aircraft, a rotorcraft, or an aircraft with neither a fixed wing nor a rotor), in water (e.g., a ship or a submarine), on land (e.g., a car or a train), in space (e.g., a space plane, a satellite, or a detector), and any combination of the above various environments. The movable object can be an aircraft, such as an unmanned aerial vehicle (UAV). In some embodiments, the movable object can carry a living being, such as a person or an animal.

Figure 11:
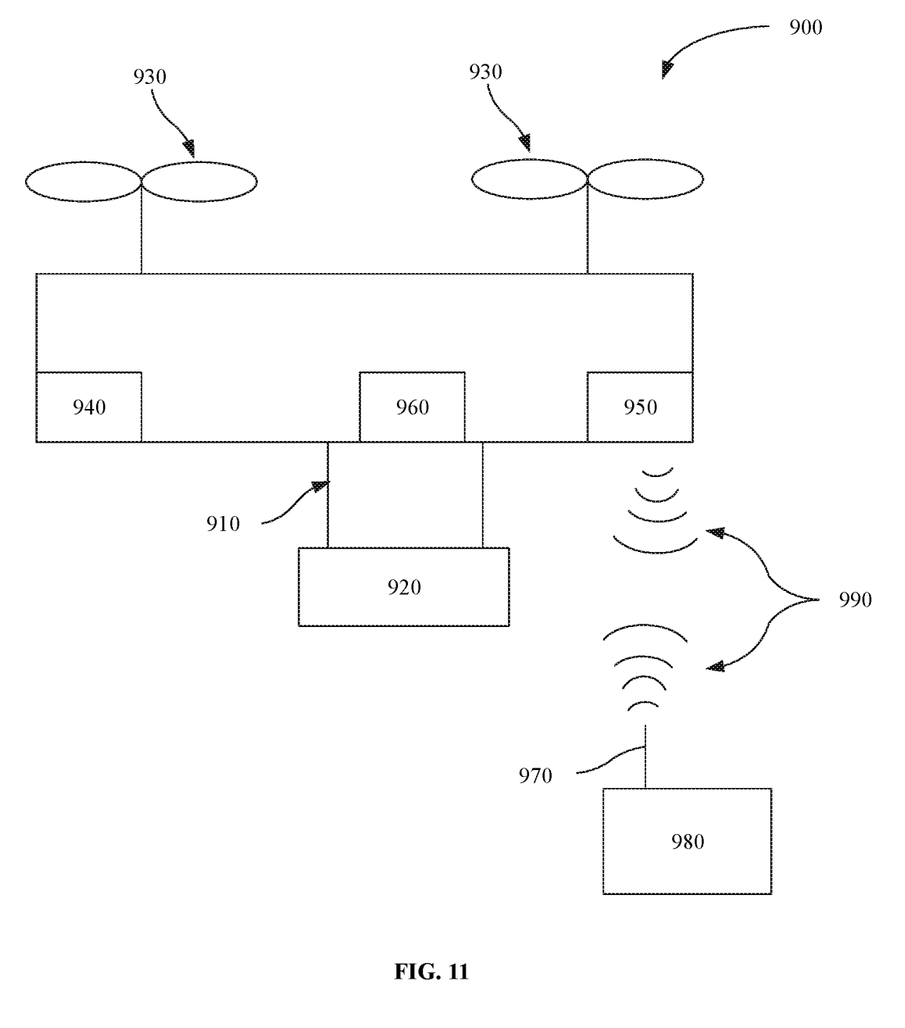
FIG. 11 is a block diagram of a movable object according to an embodiment of the present disclosure.

FIG. 11 is a block diagram of a movable object 900 according to an embodiment of the present disclosure. As shown in FIG. 11, the movable object 900 includes a carrier 910 and a payload 920. Although the movable object 900 is depicted as a UAV, this depiction is not intended to be limiting, and any suitable type of movable object can be used. In some instances, the payload 920 may be provided on the movable object 900 without requiring the carrier 910. The movable object 900 may include propulsion mechanisms 930, a sensing system 940, a communication system 950, and an image processing device 960.

The propulsion system 930 may include an electronic speed control (ESC), one or more propellers, and one or more motors corresponding to one or more propellers. The motor and the propeller may be placed on a corresponding arm. The ESC may be configured to receive a drive signal generated by a flight controller and provide a drive current to the motor based on the drivel signal to control the speed and/or steering of the motor. The motor may be used to drive the propeller to rotate to power the UAV's flight, which enables the UAV to achieve one or more degrees of freedom of motion. In some embodiments, the UAV can be rotated about one or more rotation axes. For example, the rotation axes may include a roll axis, a yaw axis, and a pitch axis. It should be understood that the motor can be a DC motor or an AC motor. In addition, the motor can be a brushless motor or a brush motor.

The sensing system 940 may be configured to sense attitude information of the UAV, that is, the position information and state information of the UAV in space, such as the three-dimensional position, three-dimensional angle, three-dimensional velocity, three-dimensional acceleration, and three-dimensional angular velocity. The sensing system 940 may include, for example, at least one of a gyroscope, an electronic compass, an inertial measurement unit (IMU), a visual sensor, a global positioning system (GPS), and a barometer. The flight controller may be used to control the flight of the UAV. For example, the flight of the UVA may be controlled based on the attitude information measured by the sensing system. It should be understood that the flight controller can control the UAV based on a pre-programmed program instructions or in response to one or more control commands from an operating device.

The communication system 950 may be configured to communicate with a terminal device 980 including a communication system 970 via a wireless signal 990. The communication system 950 and the communication system 970 may include a plurality of transmitters, receivers, and/or transceivers for wireless communication. The wireless communication may be a one-way communication for example, only the movable object 900 can transmit data to the terminal device 980. Alternatively, the wireless communication may be a two-way communication, and data may be transmitted from the movable object 900 to the terminal device 980, or transmitted from the terminal device 980 to the movable object 900.

In some embodiments, the terminal device 980 may provide control data for one or more of the movable object 900, the carrier 910, and the payload 920, and may receive information transmitted by the movable object 900, the carrier 910, and the payload 920. The control data provided by the terminal device 980 may be used to control the state of one or more of the movable object 900, the carrier 910, and the payload 920. In some embodiments, a communication module for communicating with the terminal device 980 may be included in the carrier 910 and the payload 920.

It should be understood that for details of the image processing device 960 included in the movable object 900 shown in FIG. 11, reference may be made to the above description. For brevity, details are not described herein again.

The above descriptions only illustrate some embodiments of the present disclosure. The present disclosure is not limited the described embodiments. A person having ordinary skill in the art may conceive various equivalent modifications or replacements based on the disclosed technology. Such modification or improvement also fall within the scope of the present disclosure. A true scope and spirit of the present disclosure are indicated by the following claims.

What is claimed is:

1. An optical flow tracking device comprising:
an image pyramid establishing circuit configured to establish a first image pyramid of a first image and a second image pyramid of a second image; the first image pyramid includes one or more image layers, and the second image pyramid includes one or more image layers;
an optical flow tracking circuit configured to perform an optical flow tracking processing on a $k^{th}$ image layer in the first image pyramid and a $k^{th}$ image layer in the second image pyramid to acquire an optical flow estimator of the second image in the $k^{th}$ image layer, k being an integer; and to calculate an optical flow of the second image by using the optical flow estimator of the second image in the $k^{th}$ image layer, wherein:
a plurality of multipliers are configured to perform multiplication processing of the optical flow tracking processing by multiplying data corresponding to the image layers of the first image pyramid and the second image pyramid, and each of the plurality of multipliers are configured to perform the multiplication processing on a plurality of clocks in series, and different multipliers of the plurality of multipliers are configured to perform the multiplication processing in parallel on the same clock.

2. The device of claim 1, wherein the optical flow tracking devices uses the Kanade-Lucas-Tomasi (KLT) algorithm to perform the optical flow tracking.

3. The device of claim 1, wherein the optical flow tracking circuit is further configured to:
perform a first bilinear interpolation processing on a first rectangular frame in the kth image layer of the first image pyramid;

calculate a derivative of each data with respect to x and y in a first sub-rectangular frame of the first rectangular frame by using the first rectangular frame after the interpolation processing;

calculate a matrix G by using the derivative of each data with respect to x and y in the first sub-rectangular frame;

perform a second bilinear interpolation processing on a second rectangular frame in the kth image layer of the second image pyramid to acquire the second rectangular frame after the interpolation processing;

determine an image difference between the first rectangular frame after the interpolation processing and the second rectangular frame after the interpolation processing;

determine an image mismatch vector between the first rectangular frame after the interpolation processing and the second rectangular frame after the interpolation processing based on the image difference; and calculate the optical flow estimator of the second image in the $k^{th}$ image layer by using the image mismatch vector and the matrix G.

4. The device of claim 3, wherein the optical flow tracking circuit is further configured to:
update the second rectangular frame and perform the second bilinear interpolation processing on the updated second rectangular frame to re-determine the optical flow estimator in response to the optical flow estimator acquired by using the second rectangular frame after a previous interpolation processing not satisfying a first value or a number of times an iterative calculation of the optical flow estimator not satisfying a second value.

5. The device of claim 3, wherein the optical flow tracking circuit includes a first multiplier group including a plurality of first multipliers being configured to perform the multiplication processing in the first bilinear interpolation processing, and the first rectangular frame after the interpolation processing includes a plurality of first data; and
different multipliers of the plurality of first multipliers respectively perform the multiplication processing of different first data on the same clock, and acquire the multiplication processing of the plurality of first data by using a plurality of clocks.

6. The device of claim 3, wherein the optical flow tracking circuit includes a second multiplier group including a plurality of second multipliers being configured to perform the multiplication processing when calculating the matrix G, and the first sub-rectangular frame includes a plurality of second data;
different multipliers of the plurality of second multipliers respectively perform the multiplication processing for different second data of the plurality of second data on the same clock and complete the multiplication processing of the plurality of second data by using a plurality of clocks; and
the multiplication processing for the second data includes a multiplication processing of the derivative of the second data with respect to x and y.

7. The device of claim 3, wherein the multiplier group used to perform the first bilinear interpolation processing and the multiplier group used to calculate the matrix G are not the same multiplier group.

8. The device of claim 3, wherein the optical flow tracking circuit includes a third multiplier group including a plurality of third multipliers being configured to perform the multiplication processing in the second bilinear interpolation processing when calculating the matrix G, and the second rectangular frame after the interpolation processing includes a plurality of third data; and
different multipliers of the plurality of third multipliers respectively perform the multiplication processing of different third data on the same clock, and acquire the multiplication processing of the plurality of third data by using a plurality of clocks.

9. The device of claim 3, wherein the multiplier group used to perform the second bilinear interpolation processing and the multiplier group used to calculate the matrix G are not the same multiplier group; or the multiplier group used to perform the second bilinear interpolation processing and the multiplier group used to perform the first bilinear interpolation processing are not the same multiplier group.

10. The device of claim 3, wherein the number of multipliers included in the multiplier group for performing the second bilinear interpolation processing is greater than the number of multipliers included in the multiplier group for calculating the matrix G or the number of multipliers included in the multiplier group for performing the first bilinear interpolation processing.

11. The device of claim 9, wherein the optical flow tracking circuit includes a fourth multiplier group including a plurality of fourth multipliers being configured to perform the multiplication processing for acquiring the mismatch vector by using the image difference;
different multipliers of the plurality of fourth multipliers perform the multiplication processing of different data groups in a plurality of data groups on the same clock and complete the multiplication processing needed on the plurality of data groups to acquire the image mismatch vector by using a plurality of clocks; and
one of the data groups includes a first data in the first rectangular frame after the interpolation processing, a second data corresponding to the first data in the second rectangular frame after the interpolation processing, and the image difference corresponding to the first data.

12. The device of claim 3, wherein the multiplier group used to acquire the mismatch vector includes one or more of the multiplier group used to perform the first bilinear interpolation processing, the multiplier group used to perform the second bilinear interpolation processing, and the multiplier group used to calculate the matrix G.

13. The device of claim 1, wherein a processing speed of the plurality of multipliers matches a delay of the device reading data from an off-chip storage system.

14. An optical flow tracking method, comprising:
triggering an image pyramid establishing circuit to establish a first image pyramid of a first image and a second image pyramid of a second image; the first image pyramid includes one or more image layers, and the second image pyramid includes one or more image layers;

triggering an optical flow tracking circuit to perform an optical flow tracking processing on a $k^{th}$ image layer in the first image pyramid and a $k^{th}$ image layer in the second image pyramid to acquire an optical flow estimator of the second image in the $k^{th}$ image layer, where k is an integer; and calculate an optical flow of the second image by using the optical flow estimator of the second image in the $k^{th}$ image layer, wherein:
a plurality of multipliers are configured to perform multiplication processing of the optical flow tracking processing by multiplying data corresponding to the image layers of the first image pyramid and the second image pyramid, and each of the plurality of multipliers is configured to perform the multiplication processing on a plurality of clocks in series, and different multipliers of the plurality of multipliers are configured to perform the multiplication processing in parallel on the same clock.

15. The method of claim 14, further comprising triggering the optical flow tracking circuit to:

perform a first bilinear interpolation processing on a first rectangular frame in the kth image layer of the first image pyramid;

calculate a derivative of each data with respect to x and y in a first sub-rectangular frame of the first rectangular frame by using the first rectangular frame after the interpolation processing;

calculate a matrix G by using the derivative of each data with respect to x and y in the first sub-rectangular frame;

perform a second bilinear interpolation processing on a second rectangular frame in the $k^{th}$ image layer of the second image pyramid to acquire the second rectangular frame after the interpolation processing;

determine an image difference between the first rectangular frame after the interpolation processing and the second rectangular frame after the interpolation processing;

determine an image mismatch vector between the first rectangular frame after the interpolation processing and the second rectangular frame after the interpolation processing based on the image difference; and calculate the optical flow estimator of the second image in the $k^{th}$ image layer by using the image mismatch vector and the matrix G.

16. The method of claim 15, wherein triggering the optical flow tracking circuit to perform the second bilinear interpolation processing on the second rectangular frame in the $k^{th}$ image layer of the second image pyramid to acquire the second rectangular frame after the interpolation processing includes:

updating the second rectangular frame and perform the second bilinear interpolation processing on the updated second rectangular frame to re-determine the optical flow estimator in response to the optical flow estimator acquired by using the second rectangular frame after a previous interpolation processing not satisfying a first value or a number of times an iterative calculation of the optical flow estimator not satisfying a second value.

17. The method of claim 15, wherein the optical flow tracking circuit includes a first multiplier group including a plurality of first multipliers being configured to perform the multiplication processing in the first bilinear interpolation processing, and the first rectangular frame after the interpolation processing includes a plurality of first data; and different multipliers of the plurality of first multipliers respectively perform the multiplication processing of different first data on the same clock, and acquire the multiplication processing of the plurality of first data by using a plurality of clocks.

18. The method of claim 15, wherein the optical flow tracking circuit includes a second multiplier group including a plurality of second multipliers being configured to perform the multiplication processing when calculating the matrix G, and the first sub-rectangular frame includes a plurality of second data;

different multipliers of the plurality of second multipliers respectively perform the multiplication processing for different second data of the plurality of second data on the same clock and complete the multiplication processing of the plurality of second data by using a plurality of clocks; and the multiplication processing for the second data includes a multiplication processing of the derivative of the second data with respect to x and y.

19. The method of claim 15, wherein the optical flow tracking circuit includes a third multiplier group including a plurality of third multipliers being configured to perform the multiplication processing in the second bilinear interpolation processing when calculating the matrix G, and the second rectangular frame after the interpolation processing includes a plurality of third data; and different multipliers of the plurality of third multipliers respectively perform the multiplication processing of different third data on the same clock, and acquire the multiplication processing of the plurality of third data by using a plurality of clocks.

20. The method of claim 15, wherein the multiplier group used to perform the second bilinear interpolation processing and the multiplier group used to calculate the matrix G are not the same multiplier group; or the multiplier group used to perform the second bilinear interpolation processing and the multiplier group used to perform the first bilinear interpolation processing are not the same multiplier group.

* * * * *